United States Patent [19]
Hollingshead

[11] 3,927,099
[45] Dec. 16, 1975

[54] PROCESS OF PREPARING CATALYST FREE AROMATIC DIAMINES

[75] Inventor: William S. Hollingshead, Cuyahoga Falls, Ohio

[73] Assignee: The Goodyear Tire & Rubber Company, Akron, Ohio

[22] Filed: Nov. 1, 1974

[21] Appl. No.: 519,968

[52] U.S. Cl.................................. 260/576; 252/441
[51] Int. Cl.².................... C07C 87/28; C07C 87/50
[58] Field of Search...................... 252/441; 260/576

[56] References Cited
UNITED STATES PATENTS 3,081,349  3/1963  Spacht............................ 252/441 X
3,305,584  2/1967  Spacht................................. 260/576

*Primary Examiner*—Allen B. Curtis
*Attorney, Agent, or Firm*—F. W. Brunner; J. A. Rozmajzl

[57] ABSTRACT

Primary amines and polyhydroxy aromatic compounds are condensed in the presence of iron halide catalysts to produce diamine antioxidants. Iron is known to accelerate oxidative degradation. Its presence in an antioxidant composition is therefore undesirable. Dry calcium hydroxide is added to the diamine reaction mixture to precipitate the iron. The precipitate is then filtered from the reaction mixture.

3 Claims, No Drawings

PROCESS OF PREPARING CATALYST FREE AROMATIC DIAMINES

This invention relates to a process for the removal of iron halide catalysts from the diamine antioxidant condensation products of primary amines and polyhydroxy aromatic compounds.

U.S. Pat. No. 3,305,584, the contents of which are incorporated herein by reference, discusses the removal of iron catalysts from reaction product mixtures resulting from the condensation reaction between primary amines and polyhydroxy aromatic compounds. The iron is precipitated from the hot reaction mixture, containing the diamine reaction product, in the form of an insoluble iron salt, by the addition of an aqueous solution of an alkali metal salt to form an insoluble salt of the iron. The precipitate is then filtered from the molten reaction mixture. Since iron tends to accelerate oxidative degradation, it is naturally desirable that the iron content of the diamine antioxidants prepared by this condensation reaction be as low as possible. It is desirable that compounds other than water soluble alkali metal salts be found which can be used to precipitate the iron portion of the condensation catalysts. It is also preferable that the precipitant not be added in the form of a water solution. The addition of water to the hot reaction mixture can sometimes result in severe frothing and foaming, which in turn can result in excessive pressure if in a closed container and clogging of the condenser and receiver if in an unpressured vessel. Hence the reaction mixture must be cooled before addition of the solution (see U.S. Pat. No. 3,305,584, column 4, line 4).

It is an object of this invention to provide a method of preparing aromatic diamine antioxidants with low iron levels. Other objects will become apparent as the description proceeds.

The objects of the present invention are accomplished by substituting the dry, non-water soluble salt, calcium hydroxide, for the aqueous solutions of alkali metal water soluble salts in the process described in U.S. Pat. No. 3,305,584.

The calcium hydroxide is added in dry form, i.e., in the absence of water, and is preferably of a fine particle size so as to facilitate its ready distribution throughout the reaction medium. The calcium hydroxide reacts with the iron catalyst to form ferric hydroxide which is insoluble in the reaction medium. The ferric hydroxide is then removed, e.g., by filtration.

The primary amines include aniline; o, m and p-toluidene and the xylidines, including 2,4-; 3,4-; 2,3-; 3,5-; 2,6-; 2,5- and 3,6- xylidines. Preferably the polyhydroxy aromatic compound is hydroquinone and the iron halide condensation catalyst is ferrous or ferric chloride.

The resulting diamine products are well known amine antioxidants.

The following example illustrates, but does not limit the practice of the present invention.

The following quantities of materials were combined in the manner described below.

110 grams hydroquinone (99.54%)
116 grams aniline
134 grams o-toluidine
5 grams FeCl$_3$ (anhydrous)
5 grams Ca(OH)$_2$
30 milliliters toluene The hydroquinone, ferric chloride and 40 percent (100 grms) of a mixture of the aniline and o-toluidine solution were combined and heated to 250° C. The remaining mixed amines were added at a rate so as to maintain a temperature of 250° to 260° C. The distillate was collected in 30 milliliters of toluene, thereby facilitating the separation of water (see U.S. Pat. No. 3,305,584, column 1, lines 59 to 61). The reaction mixture was cooled to 110° C. The catalyst was neutralized by the addition of the dry calcium hydroxide. The calcium hydroxide was added to the combination and the combination was allowed to digest for 30 minutes. The reaction mixture was then distilled to remove the volatiles to a pot temperature of 290° C. at 30 millimeters of mercury. The combination was then filtered through a heated funnel.

The same procedure was followed substituting a solution of five grams of anhydrous sodium carbonate in 40 milliliters of water for the calcium hydroxide.

The same procedure was also followed using 5 grams of anhydrous Na$_2$CO$_3$ in place of the calcium hydroxide. All of the three products were analyzed for iron. The procedure involving the use of the aqueous sodium carbonate resulted in an iron content of 390 parts per million (ppm). The calcium hydroxide procedure resulted in an iron content of 130 ppm. The anhydrous sodium carbonate procedure resulted in an iron content of 1900 ppm.

Although the reaction mixture was cooled in the above Example before the addition of the salt, the temperature could have been maintained in the 250° to 260° C. range for the addition of the calcium hydroxide and anhydrous sodium carbonate. Had the aqueous solution of the sodium carbonate been added at such high temperatures, frothing would have resulted causing a clogging of the condenser.

The calcium hydroxide naturally should preferably be added in an amount to precipitate a major portion, and preferably essentially all of the iron.

The above example involving the use of the calcium hydroxide could be rerun using any of the amines or hydroquinones recited earlier herein, to reduce the iron content of the reaction product.

While certain representative embodiments and details have been shown for the purpose of illustrating the invention, it will be apparent to those skilled in this art that various changes and modifications may be made therein without departing from the spirit or scope of the invention.

I claim:

1. In the process of preparing aromatic diamines comprising reacting (1) a primary amine having the structural formula

R - NH$_2$ wherein R is selected from the group consisting of primary alkyl radicals containing from 1 to 20 carbon atoms, secondary alkyl radical containing from 1 to 20 carbon atoms, aralkyl radical containing from 7 to 12 carbon atoms, cycloalkyl radical containing from 5 to 8 carbon atoms, and aryl radical conforming to the following structure

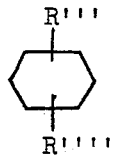

wherein R''' and R'''' are selected from the group consisting of hydrogen, primary alkyl radicals containing from 1 to 20 carbon atoms, secondary alkyl radicals containing from 1 to 20 carbon atoms, aralkyl radicals containing from 7 to 12 carbon atoms, cycloalkyl radicals containing from 5 to 8 carbon atoms and alkoxy radicals containing from 1 to 9 carbon atoms with
   (2) a polyhydroxy aromatic compound selected from the group consisting of hydroquinones, resorcinols and catechols at a temperature between 100° and 350° C. in the presence of an iron halide condensation catalyst, the improvement which comprises adding calcium hydroxide in dry form to the hot reaction mixture in an amount sufficient to precipitate essentially all of said iron in the form of an insoluble iron salt and thereafter filtering the molten reaction mixture to remove said insoluble iron salt from the resulting diamine.

2. The process according to claim 1 wherein the primary amine is selected from the group consisting of toluidines, xylidines and aniline and wherein the polyhydroxy aromatic compound is hydroquinone.

3. The process according to claim 2 wherein the iron halide condensation catalyst is ferric chloride.

* * * * *